(12) United States Patent
Ueki et al.

(10) Patent No.: US 7,931,450 B2
(45) Date of Patent: Apr. 26, 2011

(54) VARIABLE DISPLACEMENT PUMP

(75) Inventors: Takeshi Ueki, Tochigi (JP); Shingo Ishige, Tochigi (JP)

(73) Assignee: Showa Corporation, Gyoda-Shi (JP)

( * ) Notice: Subject to any disclaimer, the term of this patent is extended or adjusted under 35 U.S.C. 154(b) by 987 days.

(21) Appl. No.: 11/761,699

(22) Filed: Jun. 12, 2007

(65) Prior Publication Data

US 2008/0099270 A1 May 1, 2008

(30) Foreign Application Priority Data

Oct. 30, 2006 (JP) .................. 2006-294215

(51) Int. Cl.
*F01C 20/20* (2006.01)
*F01C 20/22* (2006.01)

(52) U.S. Cl. ............ 417/220; 418/26; 418/30; 277/589; 277/903

(58) Field of Classification Search ................... 417/220; 418/26–30; 277/578, 582, 589, 902, 903
See application file for complete search history.

(56) References Cited

U.S. PATENT DOCUMENTS

| 6,155,797 | A | 12/2000 | Kazuyoshi | |
|---|---|---|---|---|
| 6,790,013 | B2 * | 9/2004 | Hunter et al. | 417/220 |
| 7,128,542 | B2 * | 10/2006 | Suzuki et al. | 418/26 |

FOREIGN PATENT DOCUMENTS

JP    2001-59481    3/2001

\* cited by examiner

*Primary Examiner* — Devon C Kramer
*Assistant Examiner* — Patrick Hamo
(74) *Attorney, Agent, or Firm* — Babcock IP, PLLC

(57) ABSTRACT

In a variable displacement pump, an outer peripheral surface approximately in an opposite side to a portion supported to an oscillation supporting point in a cam ring with respect to a pump shaft is formed as a convex surface portion holding a seal member brought into slidable contact with an inner peripheral surface of an outer case, and an inner peripheral surface of the outer case with which the seal member held to the convex surface portion of the cam ring is brought into slidable contact is formed as a circular arc surface around the oscillation supporting point.

8 Claims, 6 Drawing Sheets

VARIABLE DISPLACEMENT PUMP

BACKGROUND OF THE INVENTION

1. Field of the Invention

The present invention relates to a variable displacement pump which is preferably used in a hydraulic power steering apparatus for a motor vehicle or the like.

2. Description of the Related Art

As a variable displacement pump, there is a structure having a rotor fixed to a pump shaft inserted to a pump casing so as to be rotationally driven, and accommodating a plurality of vanes in a groove movable in a radial direction, an outer case fitted to a fitting hole within the pump casing, a cam ring supported to an oscillation supporting point provided in an inner peripheral surface of the outer case so as to freely oscillate and displace, forming a pump chamber with respect to an outer peripheral portion of the rotor, and forming first and second fluid pressure chambers with respect to the outer case, and a discharge flow rate control apparatus introducing a pressure in an upstream side of a main throttle provided in a pump discharge side passage to the first fluid pressure chamber, and introducing a pressure in a downstream side of the main throttle to the second fluid pressure chamber, wherein the discharge flow rate control apparatus has a switch valve apparatus which is actuated on the basis of a pressure difference between the upstream and downstream sides of the main throttle, and controls a supply fluid pressure to the first fluid pressure chamber in correspondence to a discharge flow rate of a pressure fluid from the pump chamber, as described in Japanese Patent Application Laid-open No. 2001-59481 (patent document 1).

In the variable displacement pump described in the patent document 1, the seal member with which the outer peripheral surface of the cam ring is brought into slidable contact is provided in the inner peripheral surface approximately in an opposite side to the portion in which the seal pin forming the oscillation supporting point of the outer case is provided, with respect to the pump shaft, and a space between the outer case and the cam ring is comparted into the first fluid pressure chamber and the second fluid pressure chamber by the seal pin and the seal member.

However, since the cam ring is structured such that an outer peripheral surface is formed as a complete round shape, an adhesion degree of the outer peripheral surface of the cam ring with respect to the seal member provided in the outer case is changed at a time when the cam ring is oscillated around the seal pin provided in the outer case. When the cam ring reaches an oscillation end, there is a case that the outer peripheral surface of the cam ring lowers the adhesion degree with respect to the seal member and lowers a sealing performance.

SUMMARY OF THE INVENTION

An object of the present invention is to stabilize a sealing performance of a cam ring which is oscillated with respect to an outer case, in a variable displacement pump.

The present invention relates to a variable displacement pump comprising: a rotor fixed to a pump shaft inserted to a pump casing so as to be rotationally driven, and structured such that a plurality of vanes are accommodated in grooves so as to be movable in a radial direction; an outer case fitted to a fitting hole within a pump casing; a cam ring supported to an oscillation supporting point provided in an inner peripheral surface of the outer case so as to freely oscillate and displace, forming a pump chamber with respect to an outer peripheral portion of the rotor, and forming first and second fluid pressure chambers with respect to the outer case. A discharge flow rate control apparatus introduces a pressure in an upstream side of a main throttle provided in a pump discharge side passage to the first fluid pressure chamber, and introduces a pressure in a downstream side of the main throttle to the second fluid pressure chamber. The discharge flow rate control apparatus having a switch valve apparatus which is actuated on the basis of a pressure difference between the upstream and downstream sides of the main throttle, and which controls a supply fluid pressure to the first fluid pressure chamber in correspondence to a discharge flow rate of a pressure fluid from the pump chamber. An outer peripheral surface approximately in an opposite side to the portion supported to the oscillation supporting point in the cam ring with respect to the pump shaft is formed as a convex surface portion holding a seal member brought into slidable contact with an inner peripheral surface of the outer case. An inner peripheral surface of the outer case with which the seal member, held to the convex surface portion of the cam ring, is brought into slidable contact is formed as a circular arc surface around the oscillation supporting point.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 1:
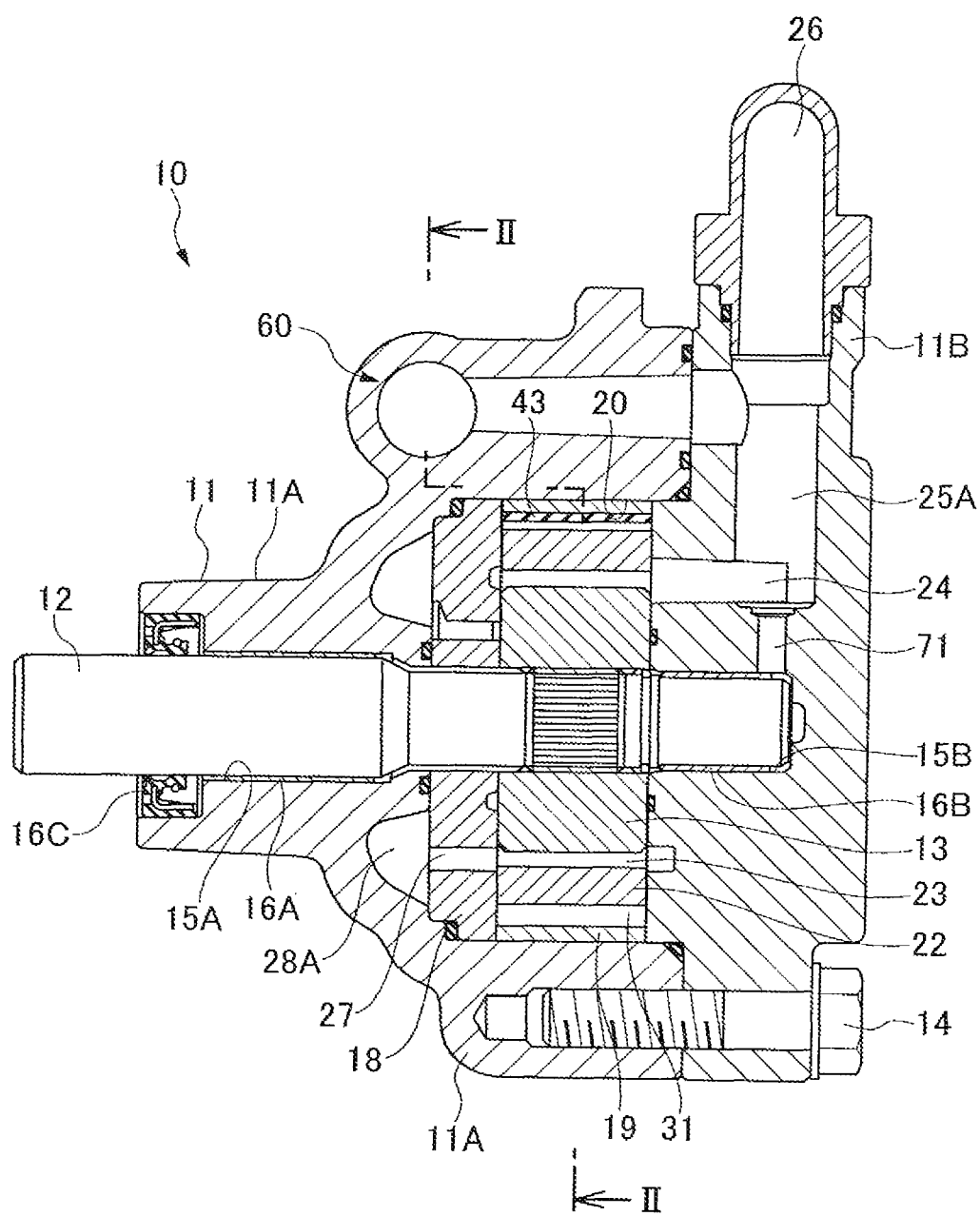
FIG. 1 is a cross sectional view showing a variable displacement pump.
Figure 2:
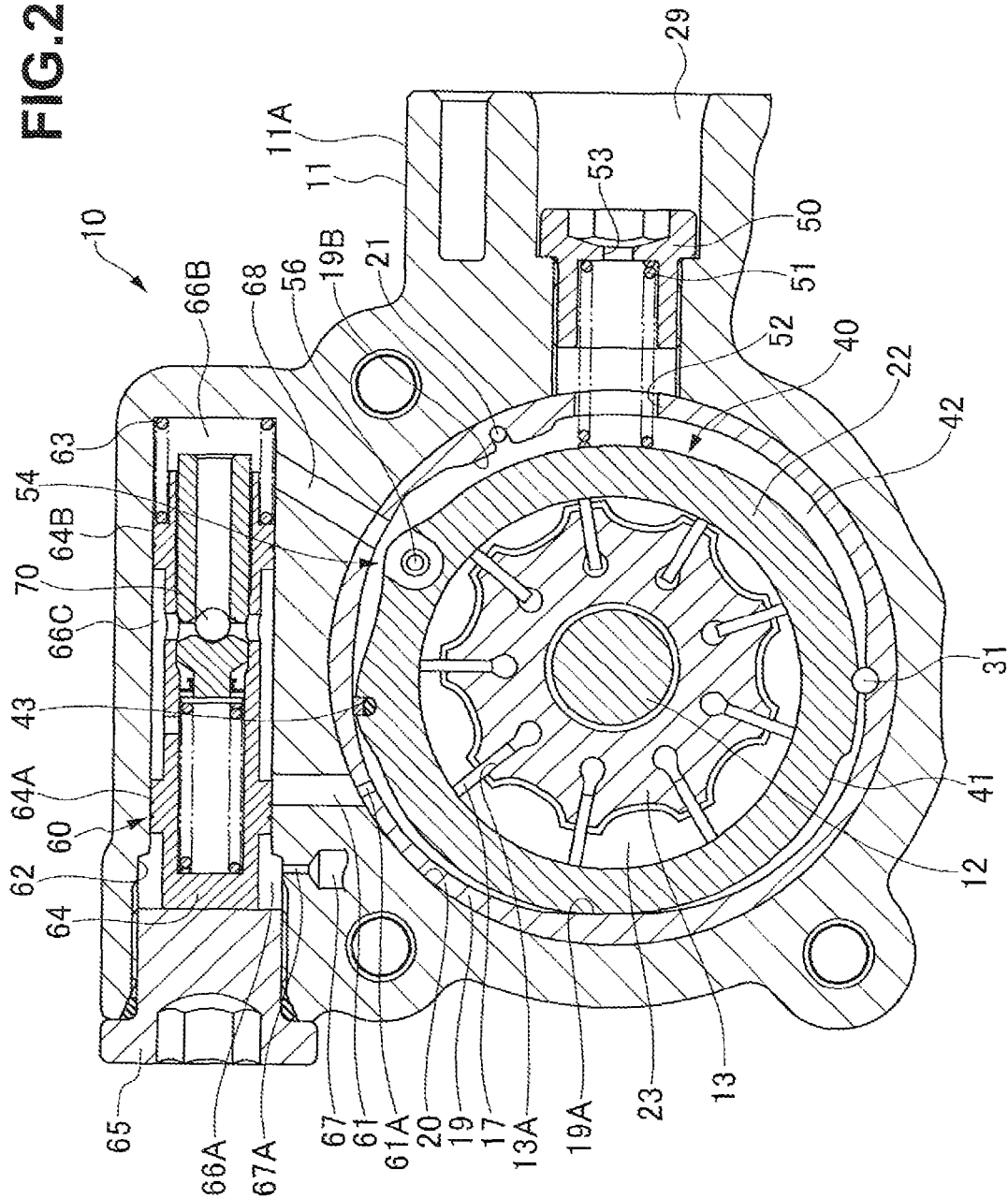
FIG. 2 is a cross sectional view along a line II-II in FIG. 1.

A variable displacement pump 10 corresponds to a vane pump forming a hydraulic pressure generating source of a hydraulic power steering apparatus of a motor vehicle, and has a rotor 13 fixed to a pump shaft 12 inserted to a pump casing 11 by serration so as to be rotationally driven, as shown in FIGS. 1 and 2. The pump casing 11 is structured by integrating a pump housing 11A and a cover 11B by a bolt 14. The pump housing 11A is provided with a cup-shaped concave space accommodating a pump constituting element such as the rotor 13 or the like, and the cover 11B is combined with the pump housing 11A in such a manner as to close an opening portion of the concave space so as to be integrated. The pump shaft 12 is supported to a bearing 16A (a bush) provided in a support hole 15A of the pump housing 11A, and a bearing 16B (a bush) provided in a support hole 15B of the cover 11B. An oil seal 16C is fitted to the support hole 15A.

The rotor 13 accommodates vanes 17 in grooves 13A provided at a plurality of positions in a peripheral direction, and makes each of the vanes 17 movable in a radial direction along the groove 13A.

A side plate 18 and an outer case 19 are fitted in a laminated state to a fitting hole 20 of the pump housing 11A of the pump casing 11, and they are fixedly held by the cover 11B from a side portion in a state of being positioned in the peripheral direction by a positioning pin 21. One end of the positioning pin 21 is fitted to the cover 11B.

The cam ring 22 is fitted to the outer case 19 mentioned above fixed to the pump housing 11A of the pump casing 11. A side portion of the cam ring 22 is closed by the cover 11B. The cam ring 22 surrounds the rotor 13 with an amount of eccentricity from the rotor 13, and forms a pump chamber 23 with respect to an outer peripheral portion of the rotor 13, between the side plate 18 and the cover 11B. A suction port 24 provided in an end surface of the cover 11B is open to a suction region in an upstream side in a rotor rotating direction of the pump chamber 23, and a suction port 26 of the pump 10 is communicated with the suction port 24 via a suction passage (a drain passage) 25A provided in the housing 11A and the cover 11B. On the other hand, a discharge port 27 provided in an end surface of the side plate 18 is open to a discharge region in a downstream side in the rotor rotating direction of the pump chamber 23, and a discharge port 29 of the pump 10 is communicated with the discharge port 27 via a high pressure chamber 28A provided in the housing 11A and a discharge passage (not shown). A discharge fluid pressure discharged by the pump chamber 23 is supplied to a power steering apparatus (a hydraulic equipment) from the discharge port 27.

Accordingly, in the variable displacement pump 10, in the case that the rotor 13 is rotationally driven by the pump shaft 12, and the vane 17 of the rotor 13 is pressed to the cam ring 22 on the basis of a centrifugal force so as to be rotated, the volumetric capacity surround by the adjacent vanes 17 and the cam ring 22 is enlarged together with the rotation in an upstream side in the rotor rotating direction of the pump chamber 23, and a working fluid is sucked from the suction port 24. In a downstream side in the rotor rotating direction of the pump chamber 23, the volumetric capacity surround by the adjacent vanes 17 and the cam ring 22 is reduced together with the rotation, and the working fluid is discharged from the discharge port 27.

The variable displacement pump 10 has a discharge flow rate control apparatus 40.

The discharge flow rate control apparatus 40 is structured such that a seal pin 31 (an oscillation supporting point) is mounted to an inner peripheral surface in a vertical bottom portion of the outer case 19 mentioned above fixed to the pump casing 11, a vertical bottom portion of the cam ring 22 is supported to the seal pin 31, and the cam ring 22 can be oscillated and displaced within the outer case 19. A lower half cross section of the seal pin 31 is fitted and mounted to a concave portion provided in an inner peripheral surface of the outer case 19 over a whole width of the outer case 19, and the cam ring 22 fits and supports a concave portion provided in an outer peripheral surface of the cam ring 22 to an upper half cross section of the seal pin 31 over a whole width of the cam ring 22.

In this case, the outer case 19 is structured such that a cam ring oscillation regulating stopper 19A brought into contact with an outer peripheral surface of the cam ring 22 is formed in a protruding manner in a part of an inner peripheral surface forming a first fluid pressure chamber 41, and an oscillation limit of the cam ring 22 for maximizing the volumetric capacity of the pump chamber 23 is regulated as mentioned below. Further, the outer case 19 is structured such that a cam ring oscillation regulating stopper 19B brought into contact with the outer peripheral surface of the cam ring 22 is formed in a protruding manner in a part of an inner peripheral surface forming a second fluid pressure chamber 42 mentioned below, and an oscillation limit of the cam ring 22 for minimizing the volumetric capacity of the pump chamber 23 is regulated as mentioned below.

In the discharge flow rate control apparatus 40, the first and second fluid pressure chambers 41 and 42 are formed between the cam ring 22 and the outer case 19. In other words, the first fluid pressure chamber 41 and the second fluid pressure chamber 42 are divided between the cam ring 22 and the outer case 19 by the seal pin 31 and a seal material 43 provided approximately at an axially symmetrical position thereof. At this time, the first and second fluid pressure chambers 41 and 42 are closed and comparted in both side portions between the cam ring 22 and the outer case 19 by the cover 11B and the side plate 18, and are provided with a communication groove communicating the first fluid pressure chambers 41 separated in both sides of the stopper 19A with each other at a time when the cam ring 22 comes into collision with the cam ring oscillation regulating stoppers 19A and 19B mentioned above of the outer case 19, and a communication groove communicating the second fluid pressure chambers 42 separated in both sides of the stopper 19B with each other.

Figure 3:
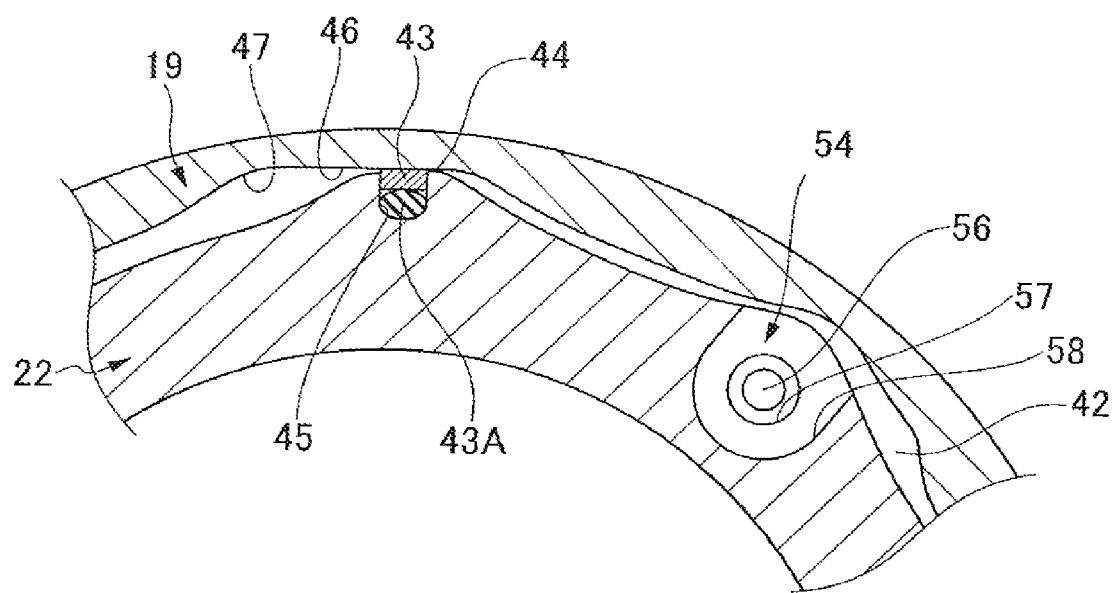
FIG. 3 is an enlarged view of a main portion in FIG. 2.

At this time, in the variable displacement pump 10, as shown in FIGS. 2 and 3, an outer peripheral surface existing approximately in an opposite side to the portion supported to the seal pin 31 of the cam ring 22 with respect to the pump shaft 12 is formed as a convex surface portion 44 holding a seal member 43 brought into slidable contact with an inner peripheral surface of the outer case 19. A top surface of the convex surface portion 44 is provided with a seal groove 45 extending over a whole width of the cam ring 22, a backup member 43A is loaded to the seal groove 45, and a seal member 43 is further loaded and held.

An inner peripheral surface of the outer case with which the seal member 43 held to the convex surface portion 44 of the cam ring 22 is brought into slidable contact is formed as a circular arc surface 46 around the seal pin 31 mentioned above. The circular arc shaped inner peripheral surface 46 of the outer case 19 is formed as a concave surface portion 47 formed in a concave shape with respect to both side inner peripheral surfaces pinching the circular arc shaped inner peripheral surface 46 from both sides in a circumferential direction.

The discharge flow rate control apparatus 40 is structured such that a spring presser foot 50 is screwed to an opposite side to the first fluid pressure chamber 41 with respect to the cam ring 22 within the discharge port 29 of the pump housing 11A constituting the pump casing 11, and a spring 51 serving as an energizing means supported by the spring presser foot 50 is brought into contact with the outer surface of the cam ring 22 through a communication hole 52 provided in the outer case 19. The spring 51 energizes the cam ring 22 in a direction of maximizing a volumetric capacity (a pump capacity) of the pump chamber 23 with respect to the outer peripheral portion of the rotor 13. The spring presser foot 50 is provided with a cavity accommodating the communication hole 52, and is constituted by a cylindrical hollow body provided with one or more discharge hole 53 constituting a part of the discharge port 29.

Figure 4:
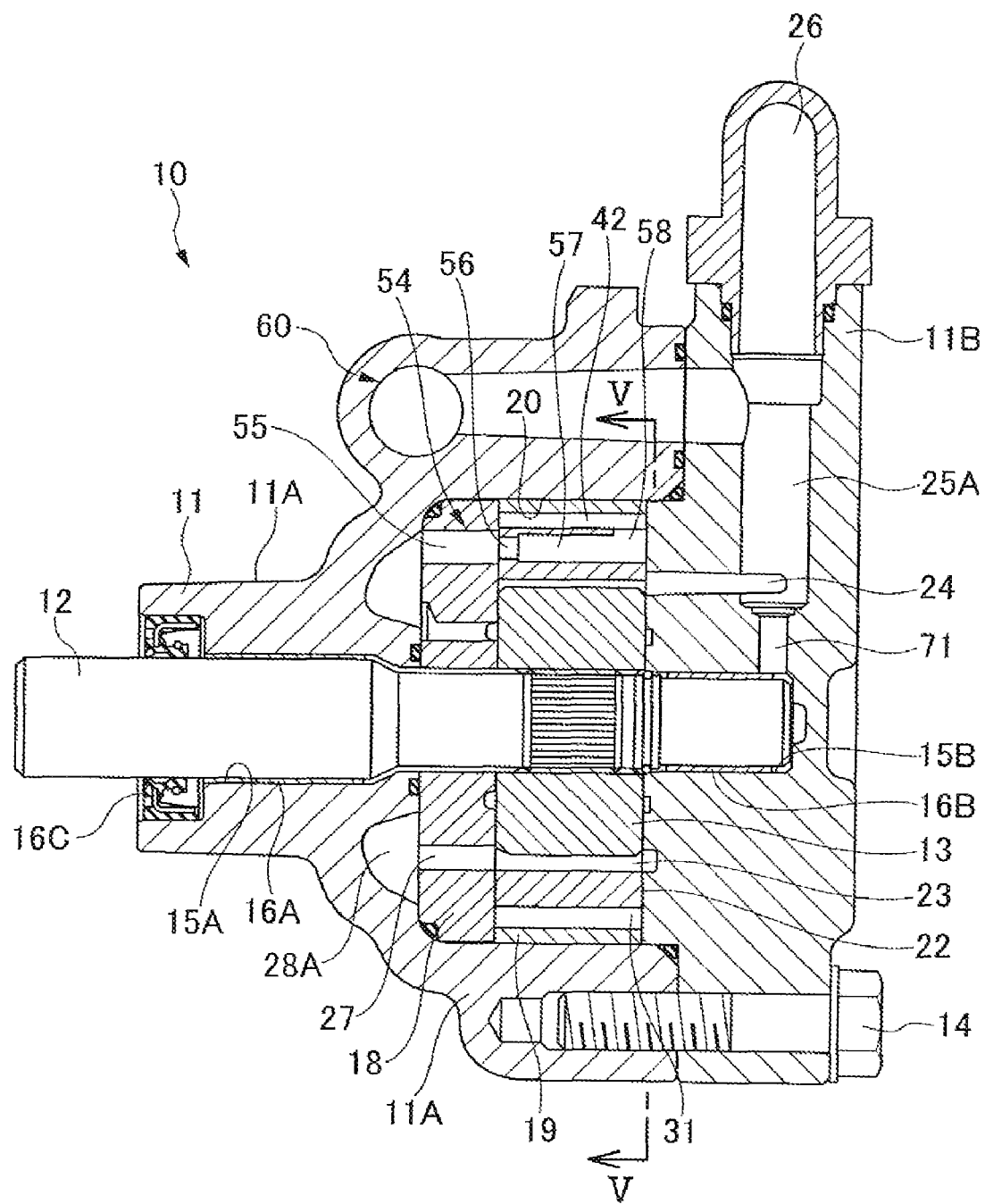
FIG. 4 is a cross sectional view showing a main throttle of the variable displacement pump.
Figure 5:
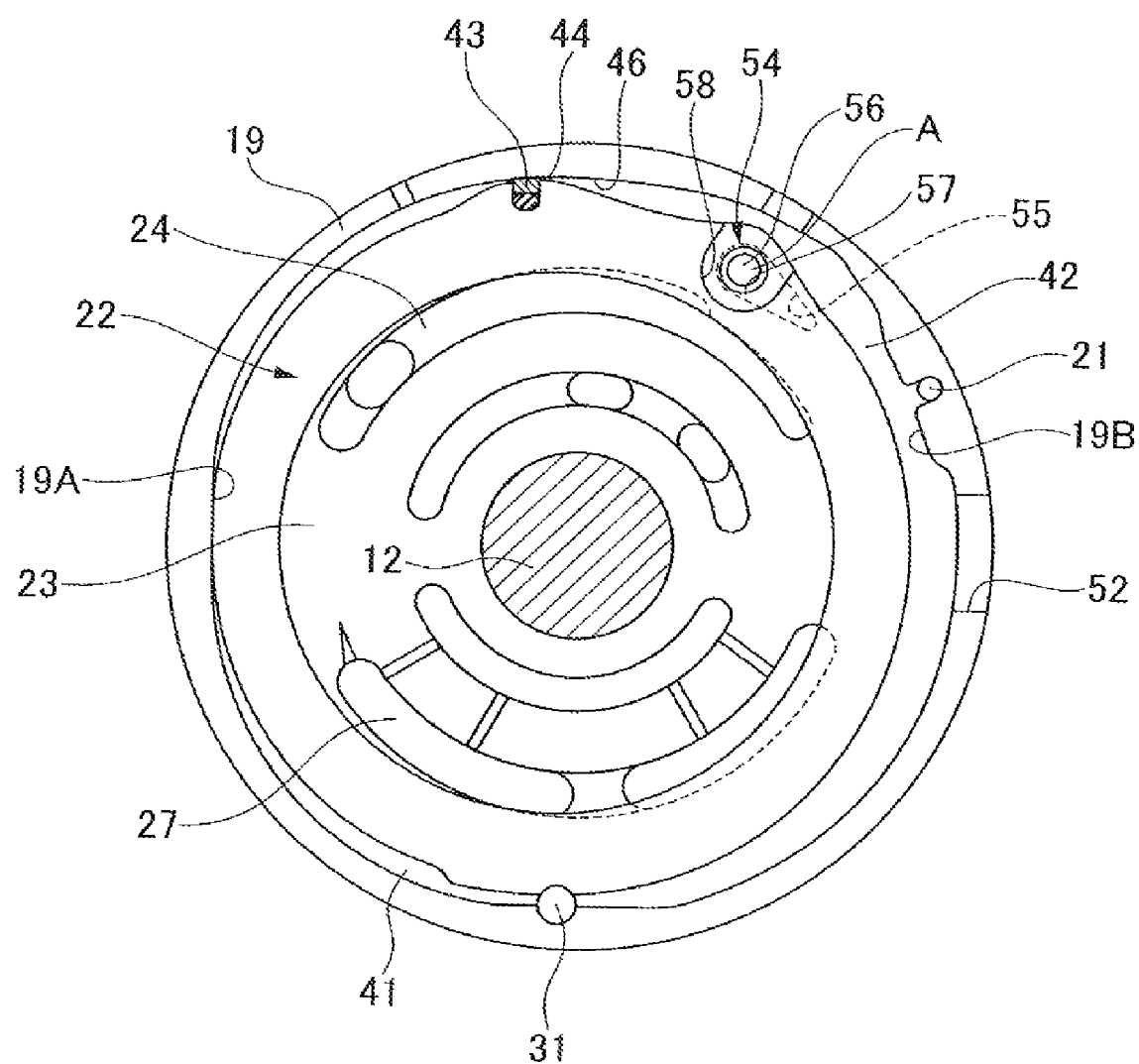
FIG. 5 is a view as seen from an arrow along a line V-V in FIG. 4.
Figure 6A:
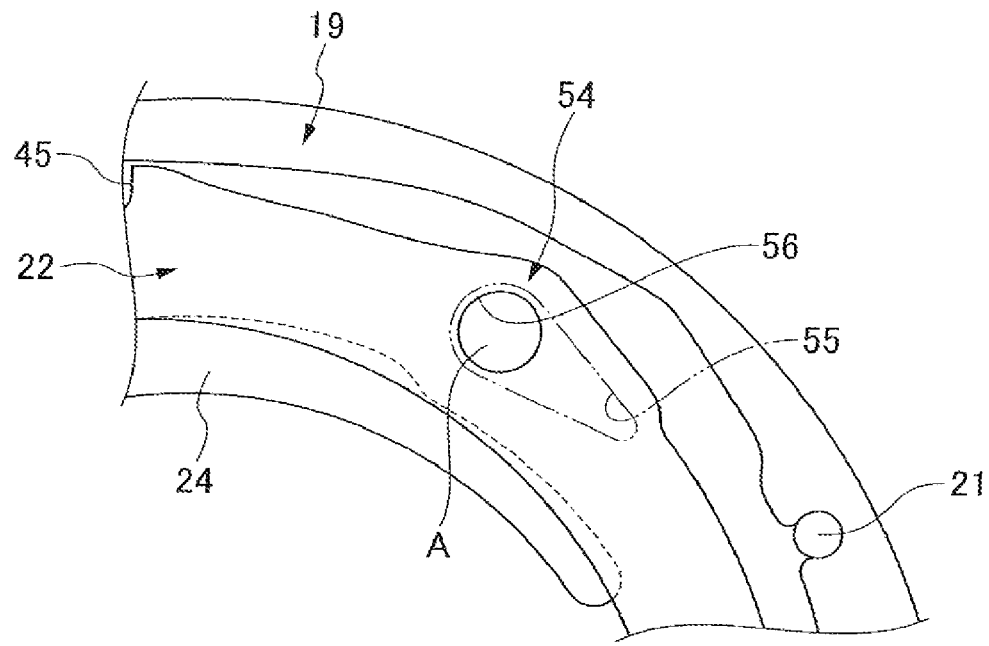
FIGS. 6A and 6B are schematic views showing an opening and closing control state of a main throttle.
Figure 6B:
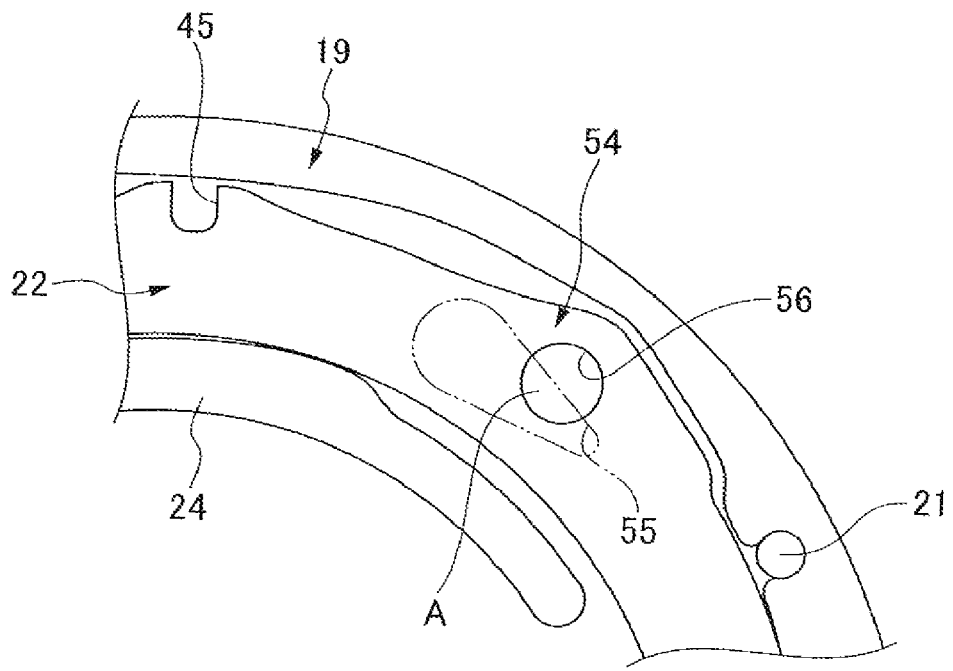

The discharge flow rate control apparatus 40 is provided with a main throttle 54 (a variable throttle) in a middle portion of a discharge passage (not shown). As shown in FIGS. 4 to 6, the main throttle 54 is constituted by a hole portion 55 pierced in an axial direction of the side plate 18 (the side wall) provided in the pump housing 11A of the pump casing 11 and closing the side surface portion of the cam ring 22, and communicating with a high pressure chamber 28A in a pump discharge side, and a circular opening portion 56 pierced in an axial direction of the cam ring 22 so as to be open to the side surface portion of the cam ring 22, controlling so as to open and close a flow path area A with the hole portion 55 mentioned above and communicating with the second fluid pressure chamber 42. In other words, the main throttle 54 is structured such as to set a coinciding portion between the hole portion 55 of the side plate 18 and the opening portion 56 of the cam ring 22 to the flow path area A, and variably throttle the flow path area A on the basis of a displacement of the opening portion 56 in accordance with the oscillation of the cam ring 22. The flow path area A becomes maximum in a full-open side by one oscillation end of the cam ring 22 (FIG. 6A), and the flow path area A becomes minimum in a full-close side at the other oscillation end of the cam ring 22 (FIG. 6B). At this time, the opening portion 56 is communicated with the second fluid pressure chamber 42 via a communication hole 57 provided in the cam ring 22 and coining next to the opening portion 56, and a U-shaped groove 58 provided in the cam ring 22 and open to the second fluid pressure chamber 42.

In this case, the opening portion 56 of the main throttle 54 pierced in the cam ring 22 is provided anywhere within a range from a position which is over 120 degree in a direction along the second fluid pressure chamber 42 from the seal pin 31 corresponding to the oscillation supporting point of the cam ring 22 up to a position at which the seal member 43 is held, in a circumferential direction around the pump shaft 12 of the cam ring 22. Further, the hole portion 55 pierced in the side plate 18 is formed in a long hole shape along a circumferential direction around the pump shaft 12 of the side plate 18, that is, a teardrop shape tapered along a direction moving away from the circular arc shaped inner peripheral surface 46 provided in the outer case 19 in the present embodiment.

The discharge flow rate control apparatus 40 (1) selectively introduces the pressure in the upstream side of the main throttle 54 and the pressure in the pump suction side to the first fluid pressure chamber 41 applying the oscillating displacement in the direction of minimizing the volumetric capacity of the pump chamber 23 via a switch valve apparatus 60 mentioned below, and (2) introduces the pressure in the downstream side of the main throttle 54 to the second fluid pressure chamber 42 applying the oscillating displacement in the direction of maximizing the volumetric capacity of the pump chamber 23 to the cam ring 22. The cam ring 22 is moved against the energizing force of the spring 51 and the volumetric capacity of the pump chamber 23 is changed so as to control the discharge flow rate of the pump 10, on the basis of a balance of the pressures applied to the first fluid pressure chamber 41 and the second fluid pressure chamber 42.

In this case, the discharge flow rate control apparatus 40 has the switch valve apparatus 60 which is actuated on the basis of the pressure difference in the upstream and downstream sides of the main throttle 54 and controls a supply fluid pressure to the first fluid pressure chamber 41 in correspondence to the discharge flow rate of the pressure fluid from the pump chamber 23. In particular, the switch valve apparatus 60 is interposed between a communication path 61 connected to the first fluid pressure chamber 41 and a communication path 67 in an upstream side of the main throttle 54 of the discharge passage (not shown), closes the first fluid pressure chamber 41 with respect to the communication path 67 in the low rotating region of the pump 10, on the basis of a cooperation with a throttle 61A provided in the communication path 61, and connects the first fluid pressure chamber 41 with the communication path 67 in the high rotating region.

In this case, the swing valve apparatus 60 is structured such that a spring 63 and a switch valve 64 are accommodated in a valve storage hole 62 pierced in the pump housing 11A, and a switch valve 64 energized by the spring 63 is carried by a cap 65 screwed with the pump housing 11A. The switch valve 64 is provided with a valve body 64A closely brought into slidable contact with the valve storage hole 62, and a switch valve body 64B, the communication path 67 in the upstream side of the main throttle 54 of the discharge passage (not shown) is communicated with a pressurizing chamber 66A provided in one end side of the valve body 64A, and a communication path 68 in a downstream side of the main throttle 54 of the discharge passage (not shown) is communicated with a back pressure chamber 66B in which the spring 63 provided in the other end side of the switch valve body 64B is stored, via the second fluid pressure chamber 42. The suction passage (the drain passage) 25A mentioned above is formed in a penetrating manner in a drain chamber 66C between the valve body 64A and the switch valve body 64B, and is communicated with a tank. The valve body 64A can open and close the communication path 61 mentioned above. In other words, in the low rotating region in which the discharge pressure of the pump 10 is low, the switch valve 64 is set to the original position shown in FIG. 2 on the basis of the energizing force of the spring 63, the pressurizing chamber 66A is closed with respect to the communication path 61 with the first fluid pressure chamber 41 by the valve body 64A, and the drain chamber 66C is conducted with the communication path 61 with the first fluid pressure chamber 41. As a result, the pressure in the pump suction side is introduced to the first fluid pressure chamber 41. In the middle and high rotating regions of the pump 10, the switch valve 64 is moved on the basis of the high-pressure fluid of the communication path 67 applied to the pressurizing chamber 66A, the pressurizing chamber 66A is opened with respect to the communication path 61 with the first fluid pressure chamber 41 by the valve body 64A, and the high-pressure fluid in the upstream side of the main throttle 54 applied to the pressurizing chamber 66A from the communication path 67 is introduced to the first fluid pressure chamber 41. In this case, a throttle 67A is provided in the communication path 67, whereby it is possible to absorb a pulsation from the upstream side of the main throttle 54.

Accordingly, a discharge flow rate characteristic of the pump 10 using the discharge flow rate control apparatus 40 is as follows.

(1) In the low speed traveling region of the motor vehicle in which the rotating speed of the pump 10 is low, the pressure of the fluid discharged from the pump chamber 23 so as to reach the pressurizing chamber 66A of the switch valve apparatus 60 is still low, the switch valve 64 is positioned at the original position, and the switch valve 64 closes the pressurizing chamber 66A with respect to the communication path 61 with the first fluid pressure chamber 41, and closes the drain chamber 66C with respect to the communication path 61 with the first fluid pressure chamber 41. Therefore, the pressure in the upstream side of the main throttle 54 is not supplied to the first fluid pressure chamber 41, and the pressure in the downstream side of the main throttle 54 is applied to the second fluid pressure chamber 42. Accordingly, the cam ring 22 is maintained in the side in which the volumetric capacity of the pump chamber 23 is maximized, on the basis of the pressure difference between the first fluid pressure chamber 41 and the second fluid pressure chamber 42 and the energizing force of the spring 51, and the discharge flow rate of the pump 10 is increased in proportion to the rotating speed.

(2) If the pressure of the fluid discharged from the pump chamber 23 so as to reach the pressurizing chamber 66A of the switch valve apparatus 60 becomes higher on the basis of the increase of the rotating speed of the pump 10, the switch valve apparatus 60 moves the switch valve 64 against the energizing force of the spring 63 so as to open the pressurizing chamber 66A with respect to the communication path 61 with the first fluid pressure chamber 41. Accordingly, the pressure in the first fluid pressure chamber 41 is increased, and the cam ring 22 is moved to the side in which the volumetric capacity of the pump chamber 23 is reduced. Therefore, the discharge flow rate of the pump 10 cancels the flow rate increase caused by the increase of the rotating speed, and the flow rate decrease caused by the volumetric capacity reduction of the pump chamber 23, with respect to the increase of the rotating speed, and a constant flow rate is maintained.

Particularly, in the discharge flow rate control apparatus 40, it is possible to control so as to switch the switch valve apparatus 60 by the differential pressure generated in the main throttle 54 on the basis of the pump discharge flow rate which is increased or decreased in correspondence to the rotating speed of the pump 10, and it is possible to oscillate and displace the cam ring 22 against the energizing force of the spring 51 or in correspondence to the energizing force. As a result, it is possible to variably control the volumetric capacity of the pump chamber 23, and it is possible to obtain a desired pump discharge characteristic increased or decreased in correspondence to the pump rotating speed. In other words, the hole portion 55 constituting the main throttle 54 changes the flow path area A controlled so as to be opened and closed by the opening portion 56 of the cam ring 22 to the full-open side at a time when the rotating speed is low (FIG. 6A), and to the close side at a time when the rotating speed is high (FIG. 6B), and regulates the opening and closing control amount of the main throttle 54, whereby it is possible to obtain the desired pump discharge flow rate.

In this case, the pump 10 has a relief valve 70 serving as a switch valve relieving an excessive fluid pressure in the pump discharge side, between the high pressure chamber 28A and the suction passage (the drain passage) 25A, and the drain chamber 66C. Further, the pump 10 is structured such that a lubricating oil supply path 71 extending toward the bearing 16B of the pump shaft 12 from the suction passage 25A is pierced in the cover 11B, and a lubricating oil return path 72 (not shown) returning to the suction passage 25B from a portion around the bearing 16A of the pump shaft 12 is pierced in the pump housing 11A.

In accordance with the present embodiment, the following operations and effects can be obtained.

(a) The inner peripheral surface of the outer case 19 with which the seal member 43 held to the convex surface portion 44 of the cam ring 22 is brought into slidable contact is formed as the circular arc surface 46 around the seal pin 31 of the cam ring 22. Accordingly, when the cam ring 22 is oscillated with respect to the seal pin 31 in the side of the outer case 19, an oscillating locus of the seal member 43 in the side of the cam ring 22 is completely along the circular arc shaped inner peripheral surface 46 of the outer case 19, and the adhesion degree (the pressing force) at which the seal member 43 in the side of the cam ring 22 is brought into slidable contact with the circular arc shaped inner peripheral surface 46 of the outer case 19 becomes constant, and the sealing performance of the cam ring 22 is stabilized.

(b) The circular arc shaped inner peripheral surface 46 of the outer case 19 with which the seal member 43 held to the convex surface portion 44 of the cam ring 22 is brought into slidable contact is formed as a concave surface portion 47 which is formed in a concave shape with respect to both side inner peripheral surfaces pinching the circular arc shaped inner peripheral surface 46 from both sides in the peripheral direction. It is possible to use both side protruding surfaces protruding to inner sides in a radial direction with respect to the concave surface portion 47, that is, both side ends in the peripheral direction of the concave surface portion 47 mentioned above of the outer case 19, as an oscillation end regulating stopper of the cam ring 22.

(c) It is possible to achieve the items (a) and (b) mentioned above, while improving a traveling stability and a steering feeling, in the hydraulic power steering apparatus for the motor vehicle.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. For example, the structure may be made such that the circular arc shaped inner peripheral surface 46 of the outer case 19 with which the seal member 43 of the cam ring 22 is brought into slidable contact is provided in a non-concave surface portion (a portion from which the concave surface portion 47 is removed) of the outer case 19.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A variable displacement pump comprising:
   a rotor fixed to a pump shaft inserted into a pump casing so as to be rotationally driven, and structured such that a plurality of vanes are accommodated in grooves so as to be movable in a radial direction;
   an outer case fitted to a fitting hole within a pump casing;
   a cam ring supported by an oscillation supporting point provided in an inner peripheral surface of the outer case so as to freely oscillate and displace, forming a pump chamber with respect to an outer peripheral portion of the rotor, and forming first and second fluid pressure chambers with respect to the outer case;
   a discharge flow rate control apparatus introducing a pressure in an upstream side of a main throttle provided in a pump discharge side passage to the first fluid pressure chamber, and introducing a pressure in a downstream side of the main throttle to the second fluid pressure chamber; and
   the discharge flow rate control apparatus having a switch valve apparatus which is actuated on the basis of a pressure difference between the upstream and downstream sides of the main throttle, and controls a supply fluid pressure to the first fluid pressure chamber in correspondence to a discharge flow rate of a pressure fluid from the pump chamber,
   wherein an outer peripheral surface of the cam ring approximately in an opposite side to the portion of the cam ring supported by the oscillation supporting point with respect to the pump shaft is formed as a convex surface portion holding a seal member brought into slidable contact with an inner peripheral surface of the outer case, and wherein the inner peripheral surface of the outer case with which the seal member held to the convex surface portion of the cam ring is brought into slidable contact is formed as a circular arc surface around the oscillation supporting point; and wherein a circular arc shaped inner peripheral surface with which the seal member is brought into slidable contact, in the inner peripheral surface of the outer case is formed as a concave surface portion which is formed in a concave shape with respect to both side inner peripheral surfaces pinching the circular arc shaped inner peripheral surface from both sides in a circumferential direction.

2. A variable displacement pump as claimed in claim 1, wherein the oscillation supporting point is constituted by a seal pin, and the cam ring is freely oscillated and displaced within the outer case, by mounting the seal pin to an inner peripheral surface of a vertical bottom portion of the outer case, and supporting the vertical bottom portion of the cam ring to the seal pin.

3. A variable displacement pump as claimed in claim 1, wherein a seal groove over a whole width of the cam ring is provided in a top surface of the convex surface portion of the cam ring, a backup member is loaded to the seal groove, and the seal member is loaded further thereto.

4. A variable displacement pump as claimed in claim 2, wherein a seal groove over a whole width of the cam ring is provided in a top surface of the convex surface portion of the cam ring, a backup member is loaded to the seal groove, and the seal member is loaded further thereto.

5. A hydraulic power steering apparatus for a motor vehicle using the variable displacement pump as claimed in claim 1.

6. A hydraulic power steering apparatus for a motor vehicle using the variable displacement pump as claimed in claim 2.

7. A hydraulic power steering apparatus for a motor vehicle using the variable displacement pump as claimed in claim 3.

8. A hydraulic power steering apparatus for a motor vehicle using the variable displacement pump as claimed in claim 4.

* * * * *